United States Patent [19]

Okuyama et al.

[11] Patent Number: 4,585,604
[45] Date of Patent: Apr. 29, 1986

[54] PROCESS FOR PREPARING AN AIR-PERMEABLE FILM

[75] Inventors: Katsumi Okuyama; Hiroyasu Mizutani, both of Mie, Japan

[73] Assignee: Mitsubishi Petrochemical Co., Ltd., Tokyo, Japan

[21] Appl. No.: 620,828

[22] Filed: Jun. 15, 1984

[30] Foreign Application Priority Data

Jun. 23, 1983 [JP] Japan .................................. 58-113483
Jun. 23, 1983 [JP] Japan .................................. 58-113484
Jun. 23, 1983 [JP] Japan .................................. 58-113485
Jun. 23, 1983 [JP] Japan .................................. 58-113486

[51] Int. Cl.$^4$ ...................... B29C 67/20; B29C 55/12; B29C 55/28
[52] U.S. Cl. .................................... 264/41; 264/154; 264/288.8; 264/565; 264/566
[58] Field of Search .............. 264/41, DIG. 13, 210.6, 264/288.8, 154, 565, 566

[56] References Cited

U.S. PATENT DOCUMENTS

| | | | |
|---|---|---|---|
| 2,987,767 | 6/1961 | Berry et al. | 264/565 |
| 3,154,461 | 10/1964 | Johnson | 264/DIG. 13 |
| 3,758,661 | 9/1973 | Yamamoto et al. | 264/284 X |
| 3,765,999 | 10/1973 | Toyoda | 264/291 X |
| 4,350,655 | 9/1982 | Hoge | 264/211 X |

FOREIGN PATENT DOCUMENTS 4125 1/1941 Japan .
48-19229 6/1973 Japan .

Primary Examiner—Philip Anderson
Attorney, Agent, or Firm—Oblon, Fisher, Spivak, McClelland & Maier

[57] ABSTRACT

A process for producing an air-permeable film, which comprises:
(a) biaxially stretching a tubular unstretched film of a composition comprising 42 to 87 vol % of a thermoplastic resin and 58 to 13 vol % of an inorganic filler along a truncated-conical mandrel;
(b) blowing a gas over the outside of the biaxially stretched tubular film to cool said film; and
(c) simultaneously blowing a gas continuously into the tube of the film so as to penetrate the gas through the film and go outside.

17 Claims, 1 Drawing Figure

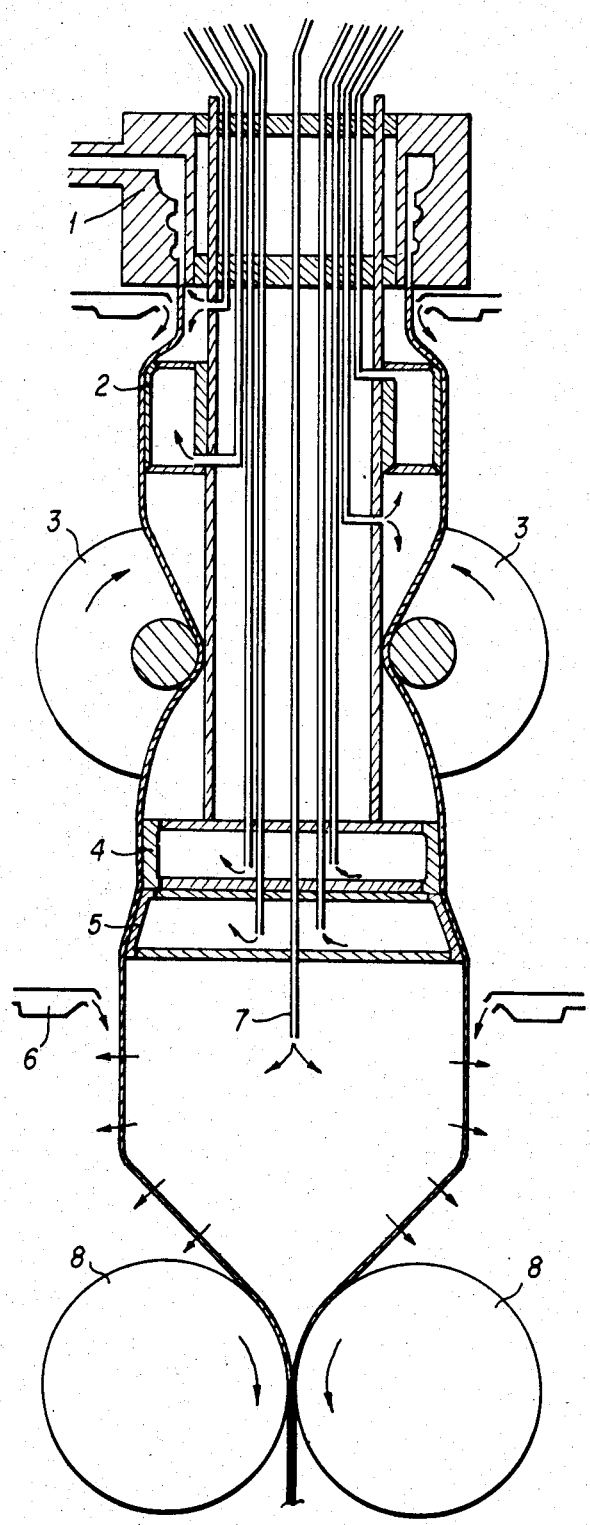

PROCESS FOR PREPARING AN AIR-PERMEABLE FILM

FIELD OF THE INVENTION

The present invention relates to a process for producing an air-permeable film by biaxially stretching a tubular unstretched film of a composition comprising a thermoplastic resin and an inorganic filler.

Many methods have been proposed for producing an air-permeable film by biaxially stretching an unstretched film of a composition comprising a thermoplastic resin and an inorganic filler, thereby introducing a number of open voids into the film. The biaxial stretching processes include a process of biaxially stretching a film in a flat form and a process of biaxially stretching a film in a tubular form. The process of biaxially stretching the flat film is not economical for two reasons: (1) The edges of the film that are pinched with clips during stretching in the transverse direction must be trimmed off to produce a final product; and (2) the process requires a very expensive stretching equipment. Furthermore, the process currently used commercially comprises stretching a flat film in the machine direction and the transverse direction in separate steps, and therefore, the film stretched by this method does not have the balanced mechanical properties.

In order to overcome these problems, a process has been proposed, which comprises stretching the film in a tubular form. In addition to its relatively low investment, this process achieves a higher productivity since no clip is used and all parts of the film are stretched. Furthermore, the film is stretched in the machine and transverse directions almost simultaneously, so that the resulting film has balanced mechanical properties.

The process of biaxially stretching the film in a tubular form includes an internal pressure bubble stretching process which comprises stretching a film by internal pressure of a pressurized gas and a mandrel stretching process which comprises stretching a film by inserting a truncated-conical mandrel into a tubular unstretched film.

The internal pressure bubble stretching process comprises stretching a film in a transverse (circumferential) direction by an internal pressure between rolls, while stretching the film in the machine direction by the difference in the peripheral speed between low speed rolls and high speed rolls. The low speed rolls and high speed rolls have a nip roll system to prevent the leakage of the pressurized gas. Therefore, if a tubular unstretched film of a composition comprising a thermoplastic resin and an inorganic filler is biaxially stretched by this internal pressure bubble process, the film passing through the nip of the low-speed rolls is folded up into two, and the edges along the fold lines deform plastically to cause separation of the inorganic filler from the resin matrix. This defective area starts to be stretched with a low stretch stress and causes inconsistent stretching, which leads to an undesired change in the shape of the tubular film being stretched. At the same time, this area is stretched in an excessively high stretch ratio and causes uneven distribution of voids in the film. This results in streaks running in the machine direction and prevents the formation of an air-permeable film having a uniform quality. Furthermore, this internal pressure bubble process is not highly suitable for continuous production of an air-permeable film in a stable manner because the pressurized gas applied to the inner surface of the tubular film between the low-speed and high-speed rolls for stretching in the transverse direction will leak out of the air-permeable film.

These problems can be solved by using a truncated-conical mandrel as a guide means for stretching the tubular film because uniform stretching is ensured and the absence of the need for a pressurized gas eliminates the fold lines, and hence the longitudinal streaks, that form as a result of passage through the nip rolls. However, when the film is stretched along the mandrel, a considerable amount of compressive stress develops through the thickness of the film and this stress collapses the voids that have once formed in the film as a result of stretching. Therefore, even the use of the mandrel is unable to produce a high-quality air-permeable film.

As shown above, none of the prior art processes have attained the object of manufacturing a highly air-permeable film with balanced mechanical properties in machine and transverse directions by biaxially stretching a tubular film made of a composition comprising a thermoplastic resin and an inorganic filler.

Air-permeable films have a wide variety of uses, and their recent applications include sanitary products such as disposable diapers, and sanitary napkins. The films used in these applications must have a soft touch resembling fabrics rather than paper. This requirement could be fulfilled by using a "flexible" thermoplastic resin having low rigidity, but no prior art process that has been proposed to date is capable of consistent manufacture of a soft, highly air-permeable and uniformly thick film having balanced mechanical properties in machine and transverse directions.

The softness or flexibility of a film depends largely upon the thickness of the film, and the thinner the film, the better. However, in the conventional process, a sufficiently thin air-permeable film cannot be continuously stretched from a composition comprising a thermoplastic resin and an inorganic filler because local neckings occur as soon as the stretching operation is started. Furthermore, the thickness of a tubular unstretched film is less uniform than that of a flat unstretched film, and as a result, the biaxially stretched tubular film generally has a thickness which is less uniform than that of the flat film drawn biaxially. It has therefore been impossible to manufacture a thin air-permeable film having a high uniform thickness and balanced mechanical properties in the machine and transverse directions in a stable manner.

SUMMARY OF THE INVENTION

The present invention has been accomplished to overcome those problems of the prior art processes.

One object of the present invention is to provide a process for producing a highly air-permeable film having balanced mechanical properties in the machine and transverse directions in a stable manner.

Another object of the present invention is to provide a process for producing a highly air-permeable film having a uniform thickness, a high degree of softness and balanced mechanical properties in machine and transverse directions in a stable manner.

A further object of the present invention is to provide a process for producing a sufficiently thin and highly air-permeable film having a high uniform thickness and balanced mechanical properties in machine and transverse directions in a stable manner.

The first object of the present invention can be achieved by a process which comprises:

(1) biaxially stretching a tubular unstretched film of a composition comprising 42 to 87 vol % of a thermoplastic resin and 58 to 13 vol % of an inorganic filler along a truncated-conical mandrel;

(2) blowing a gas over the outside of the biaxially stretched tubular film to cool the film; and (3) simultaneously, blowing a gas continuously into the tube of the film so as to penetrate the gas through the film and go outside.

The second object of the invention can be achieved by using as the thermoplastic resin either (1) an ethylene/α-olefin copolymer having a density of 0.910 to 0.940 g/cm$^3$, a melt flow rate of 0.1 to 5 g/10 min and a Q value of 4 or more, the Q value being defined as the ratio of the weight average molecular weight to the number average molecular weight; or (2) a mixture of 10 to 90 wt % of an ethylene/α-olefin copolymer having a density of 0.910 to 0.940 g/cm$^3$ and a melt flow rate of 0.1 to 5 g/10 min and 90 to 10 wt % of a high-density polyethylene having a density of 0.941 g/cm$^3$ or more, a melt flow rate of 1.0 g/10 min or less and a Q value, as defined above, of 8 or higher.

The third object of the invention can be attained by using as the inorganic filler a mixture of 50 to 97 vol % of a first inorganic filler having an average particle size of 0.7 to 4 μm and 50 to 3 vol % of a second inorganic filler having an average particle size of 0.05 to 0.7 μm, the two fillers being mixed in such proportions that the ratio of the average particle size of the first filler to that of the second one is 2 to 20.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

The FIGURE shows the extrusion and the tubular, biaxial stretching apparatus of Example 1.

DETAILED DESCRIPTION OF THE INVENTION

The thermoplastic resin used in the present invention is polyolefins (e.g. homopolymers such as low-density polyethylene, high-density polyethylene or polypropylene; and copolymers such as ethylene/propylene copolymers or ethylene/butene-1 copolymers), polyesters or polyamides. These resins may be used alone or in combination. Of those resins, polyolefins, particularly high-density polyethylene and ethylene/α-olefin copolymers are preferred.

The ethylene/α-olefin copolymers are straight-chain low-density ethylene copolymers comprising 1 to 20 wt %, preferably 3 to 15 wt %, of α-olefins having a C$_3$-C$_8$ molecular skeleton and 99 to 80 wt %, preferably 97 to 85 wt %, of ethylene. These copolymers are produced by copolymerizing ethylene and at least one α-olefin having a C$_3$-C$_8$ molecular skeleton in the presence of a catalyst made of a combination of a transition metal compound and an organometallic compound. The ethylene/α-olefin copolymers have molecular structures, melt properties, crystallization properties, solid physical properties and stretching characteristics different from those of the conventional branched low-density polyethylene resins that are produced by polymerizing ethylene through radical reaction under high pressure in the presence of an oxygen radical initiator.

The ethylene/α-olefin copolymers suitable for use in the present invention have a density of 0.910 to 0.940 g/cm$^3$, preferably 0.916 to 0.935 g/cm$^3$, and a melt flow rate (MFR) of 0.1 to 5 g/10 min, preferably 0.1 to 3 g/10 min. The ethylene/α-olefin copolymers having a Q value (i.e., the ratio of the weight average molecular weight to the number average molecular weight) of 4 or more are preferred, and those having a Q value of 6 or more are particularly preferred. Although the use of a single ethylene/α-olefin copolymer is preferred, two or more copolymers having different indices may be used if the mixture has a density, MFR and Q value within the ranges defined above.

If the ethylene/α-olefin copolymer has a density of less than 0.910 g/cm$^3$, uniform stretching is not possible, and if its density exceeds 0.940 g/cm$^3$, a stretched film having the desired softness cannot be obtained. If the MFR of the copolymer is less than 0.1 g/10 min, an abnormal fluidity occurs in melt extruding an unstretched film from a die and a uniform unstretched film cannot be obtained. If the MFT exceeds 5 g/10 min, uniform stretching is not ensured. If the Q value of the copolymer is less than 4, uniform stretching tends to be difficult, and a uniform thickness tends to be lost.

The high-density polyethylene which is also suitable for use in the present invention has a density of 0.941 g/cm$^3$ or more, preferably 0.945 g/cm$^3$ or more, and an MFR of 1.0 g/10 min or less, preferably 0.1 g/10 min or less. The high-density polyethylene having a Q value of 8 or more is preferred, and one having a Q value of 10 or more is particularly preferred. Two or more high-density polyethylenes having different indices may be used in the present invention if the mixture has a density, MFR and Q values within the ranges defined above.

If the density of the high-density polyethylene is less than 0.941 g/cm$^3$, the film adheres to the surface of the mandrel so strongly that the film cannot be stretched uniformly in the machine direction. If the MFR of the polymer exceeds 1.0 g/10 min, uniform stretching in the transverse direction becomes difficult. If the Q value is less than 8, uniform stretching tends to be difficult and a uniform film thickness will not be obtained.

The ethylene/α-olefin copolymer may be used in combination with the high-density polyethylene in order to produce an air-permeable film having a high degree of softness. In this case, the ethylene/α-olefin copolymer is used in an amount of 10 to 90 wt %, preferably 30 to 80 wt %, and the high-density polyethylene is used in an amount of 90 to 10 wt %, preferably 70 to 20 wt %. If the proportion of the high-density polyethylene is less than 10 wt %, its ability to provide a more uniform stretching in the transverse direction tends to be lost. If more than 90 wt % of the high-density polyethylene is used, an air-permeable film having the desired softness will not be obtained.

Examples of the inorganic filler used in the present invention are calcium carbonate, calcium oxide, talc, clay, silica, titanium oxide, alumina and aluminum sulfate, and these fillers may be used either alone or in combination. These inorganic fillers are preferably used in forms other than plates, and rods, and preferred shapes are spheres, granules and irregular forms having an aspect ratio of approximately 1. The preferred inorganic fillers have an average particle size in the range of 0.05 to 4 μm. If their average particle size is less than 0.05 μm, the film does not stretch enough to ensure smooth biaxial stretching. If the average particle size exceeds 4 μm, the biaxially stretched film has such an uneven surface that it is not suitable for use as an air-permeable film, and in addition, a film of a thickness of 60 μm or less cannot be continuously produced in a stable manner.

For the purpose of manufacturing a very thin air-permeable film having a uniform thickness, the use of two inorganic fillers is preferred. One inorganic filler A has a larger average particle size DA and the other inorganic filler B has a smaller size DB. The DA of filler A is in the range of from 0.7 to 4 μm, preferably 0.8 to 2 μm, and the DB of filler B ranges from 0.05 to 0.7 μm, preferably 0.1 to 0.6 μm. The ratio of DA to DB (DA/DB) is in the range of from 2 to 20, preferably 2.5 to 15, more preferably 3 to 10.

When used in combination 50 to 97 vol %, preferably 60 to 95 vol %, of filler A is mixed with 50 to 3 vol %, preferably 40 to 5 vol %, of filler B.

If only filler A is used in the amount sufficient to provide the desired air-permeability, stretching of the film is possible but a sufficiently thin air-permeable film having a uniform thickness cannot be obtained from a tubular film since it occurs local neckings while it is stretched along a truncated-conical mandrel. If only filler B is used in the amount sufficient to provide the desired air-permeability, the tubular film will not stretch sufficiently to provide a thin film by stretching along the mandrel. However, surprisingly although no plausible explanation can be given, the combined use of fillers A and B minimizes the occurrence of local neckings and enables the production of a sufficiently thin stretched film having a uniform thickness.

If the average particle size of inorganic filler A exceeds 4 μm, a stretched film, the surface of which is too rough to be used as an air-permeable film, and the development of pinholes prevents the continuous and stable production of a stretched film having a uniform air-permeability. If the average particle size of filler A is less than 0.7 μm, the results are the same as those which occur when filler B is used alone; the tubular film will not stretch sufficiently to provide a thin film by stretch along the mandrel. Inorganic filler B does not exhibit its ability to prevent local neckings in thin film if its average particle size is beyond 0.7 μm or less than 0.05 μm. If the ratio of the average size of filler A to that of filler B exceeds 20, the tubular film cannot be stretched into a sufficiently thin film along the mandrel without break. If the ratio of the two average sizes is less than 2, the occurrence of local neckings in a thin film is unavoidable.

If the proportion of filler A exceeds 97 vol %, local neckings occur unavoidably in the film which has been stretched to a reduced thickness. If the proportion of filler A is less than 50 vol %, the tubular film which should slip on the surface of the mandrel under compressive stress sticks to the mandrel and a sufficiently thin film cannot be obtained continuously in a stable manner.

The inorganic filler may be mixed with the thermoplastic resin under heating in a single-screw or twin-screw extruder, Banbury mixer, kneader or mixing rolls. If desired, conventional additives such as a dispersant, heat stabilizer, UV absorber, lubricant, pigment and an antistate may be mixed simultaneously with these two principal components. Better results may be obtained by using a higher aliphatic acid of 12 or more carbon atoms as a dispersant. The inorganic filler may be treated with the dispersant and other additives before it is mixed with the thermoplastic resin under heating.

The mixing ratio of the thermoplastic resin and the inorganic filler is such that 42 to 87 vol %, preferably 55 to 80 vol %, of the resin is mixed with 58 to 13 vol %, preferably 45 to 20 vol %, of the filler. If the proportion of the inorganic filler is less than 13 vol %, the voids that have formed in the film by separating of the filler from the resin matrix do not communicate with each other to ensure the necessary air permeability. If the proportion of the inorganic filler exceeds 58 vol %, the tubular film does not stretch enough to enable its biaxial stretching along the mandrel.

According to the present invention, a tubular film is biaxially stretched along a truncated-conical mandrel, one end of which is equal to or slightly smaller than the diameter of the tube of the unstretched film and the other end of which has a diameter substantially equal to the value finally obtained by stretching in the transverse (circumferential) direction. As it is guided along the slope of the mandrel, the tubular film is stretched in the machine and transverse directions under compressive stress on the surface of the mandrel by the force developing while the cooled film is taken up nip rolls positioned downstream of the mandrel. The mandrel is preferably fixed at its smaller end to a support rod connected to an annular die through which the tubular film is extruded.

The stretching temperature is a temperature which causes orientation by stretching, and as is known, this temperature has a relatively wide range and can be readily define by those skilled in the processing of plastic films. Generally, the stretching temperature is within a range slightly lower than the melting point of the resin used. In the present invention, the tubular film is stretched by contacting the mandrel, so that the stretching temperature, $Ts(°C.)$, and the melting point, $Tm(°C.)$, preferably meet the relationship: $Tm-50 \leq Ts \leq Tm-5$ (°C.). The unstretched film may be heated to the stretching temperature either internally through the mandrel or externally. However, in order to achieve uniform heating, at least the interior of the film is preferably heated.

For stretching in a stable manner, the stretching ratio is preferably in the range of 1.5 to 4 in both machine and transverse directions.

According to the present invention, when the tubular film leaves the mandrel after its biaxial stretching is substantially completed, a gas, typically air as in the prior art technique, is blown from the outside of the film so as to cool it, and at the same time, a gas is continuously blown into the tube of the film so that the gas penetrates through the film and goes outside.

It is difficult to determine the exact volume of the gas to be blown into the tube of the film since it varies with the properties and shape of the stretched film, the stretching speed, as well as the temperature and volume of the cooling gas. Generally, a suitable value is selected from the range of 0.1 to 150 $Nl/m^2$.min, preferably 1 to 70 $Nl/m^2$.min, provided that the tube of the film maintains a diameter substantially equal to the value obtained upon completion of the biaxial stretching. A film whose air permeability increases gradually can be produced by introducing an increasing amount of the gas into the tube while more cooling gas is blown over the outside of the film at the same time. Air is most common as the gas to be blown into the tube of the film. The gas is blown into the tube of the film through a conduit which is connected to an external pressurized container and penetrates through an annular die, the mandrel supporting rod and the mandrel interior and which opens at the larger-diameter end of the mandrel.

The process for producing an air-permeable film of the present invention comprises the following five steps: (1) extruding a molten tubular film through the lip gap of an annular die to provide a diameter equal to or larger than the lip diameter and continuously taking up a solidified film; (2) preheating the film to a temperature suitable for the subsequent stretching; (3) biaxially stretching the heated film along a truncated-conical mandrel under compressive stress on the surface of the mandrel; (4) after the stretching of the film is substantially completed, cooling the tubular film off the mandrel with a controlled gas by blowing over the outside of the tube, and simultaneously providing the film with air permeability by continuously blowing a controlled pressurized gas into the tube of the film so that the gas penetrates through the entire circumference of the tube; and (5) winding up the cooled stretched film as the finished product.

The air-permeable film produced according to the present invention can be provided with desired physical properties by controlling the type of the thermoplastic resin, the particle size of the inorganic filler, its type and filling ratio, the temperature of biaxial stretching, the stretching ratio in machine and transverse directions, the volume of the cooling gas to be blown, and the volume of the gas to be introduced into the tube of the film. For films having thicknesses between 25 and 150 μm, a preferred air permeability is in the range of 25 to 30,000 seconds/100 cc as measured in accordance with JIS P 8117, and a preferred moisture permeability is in the range of 300 to 25,000 g/m² in 24 hrs as determined by JIS Z 0208. If thin films are to be formed, their thickness is preferably not more than 60 μm, with 50 μm or below being particularly preferred.

The present invention is hereunder described in greater detail by reference to the following examples, to which the scope of the invention is by no means limited.

EXAMPLE 1

A powder (65 vol %) of an ethylene/butene-1 copolymer (density: 0.920 g/cm³, MFR: 2.0 g/10 min, m.p. 124° C.), 35 vol % of ground calcium carbonate (average particle size: 1.2 μm, irregular form other than plates and rods), 0.1 part by weight of a heat stabilizer (2,6-di-t-butyl-p-cresol) per 100 parts by weight of the ethylene/butene-1 copolymer and 1.0 part by weight of a dispersant (oleic acid) per 100 parts by weight of the ground calcium carbonate were charged into a super mixer and were blended for 5 minutes. The blend was fed into a twin-screw extruder, from which a strand was extruded at 200° C. and cut into pellets.

The pellets were extruded at 210° C. from a 4-thread spiral annular die 1 (lip dia. 75 mm, lip gap, 1 mm) on an extruder (screw diameter: 50 mm, L/D ratio: 25) and the extrudate was brought into contact with a chilling mandrel 2 (100 mm diameter) constructed internally to circulate water (5° C.) so as to solidify the melt at a blowup ratio of 1.33, followed by pulling 3 a tubular form of unstretched film having a thickness of 200 μm at a rate of 4 m/min.

The film was heated to 114° C. on a preheating mandrel 4 (98 mm diameter) connected below the chilling mandrel 21. Thereafter, the film was biaxially stretched along a truncated-conical mandrel 5 (114° C.) having a sand-blasted surface (asperities: 0.5 μm) which was directly connected at one end (98 mm diameter) to the preheating mandrel and terminated at the other end at a diameter of 250 mm. The cone angle of the mandrel was 90°. The stretching ratios were 2.5 and 3.0 in transverse and machine directions, respectively. Over the entire outside surface of the biaxially stretched tubular film off the truncated-conical mandrel, chilling air (15° C.) was blown at 5 m/sec from an air ring 6 (diameter: 350 mm, lip gap: 3 mm) positioned 50 mm below the bottom of the mandrel. At the same time, air (20° C.) was continuously blown into the tube of the film at 20 Nl/m².min from a conduit 7 also positioned beneath the mandrel. As the air was forced to escape through the film, the tubular film was continuously pulled by nip rolls 2.

The appearance and physical properties of the resulting air-permeable film are shown in Table 1.

EXAMPLE 2

An air-permeable film was produced by repeating the procedure of Example 1 except that chilling air was blown over the outside of the biaxially stretched tubular film at 10 m/sec while air was blown into the tube of the film at 40 Nl/m².min. The data for the film obtained is shown in Table 1.

EXAMPLE 3

An air-permeable film was produced by repeating the procedure of Example 1 except that the tubular unstretched film was preheated and stretched at 112° C. and that chilling air was blown over the outside of the biaxially stretched tubular film at 20 m/sec while air was blown into the tube of the film at 40 Nl/m².min. for the film obtained is also shown in Table 1.

EXAMPLE 4

An air-permeable biaxially stretched film was produced in the same procedure as in Example 1 except that no air was blown into the tube of the film from a conduit beneath the frustoconical mandrel. The data for the film obtained is shown in Table 1.

EXAMPLE 5

An air-permeable film was produced in the same procedure as in Example 1 except for the following points: the powder of ethylene/butene-1 copolymer was replaced by a powder of high-density polyethylene (density: 0.956 g/cm³, MFR: 0.05 g/10 min, m.p.: 135° C.); the feed was pelletized at 270° C. and extruded as a tubular unstretched film (150 μm thick) at 250° C.; the film was preheated and biaxially stretched at 119° C. at a stretching ratio of 2.5 in the machine direction; chilling air was blown over the outside of the biaxially stretched tubular film at 20 m/sec while air was blown into the tube of the film at 60 Nl/m².min. The data for the air-permeable film obtained is shown in Table 1.

TABLE 1

| Example No. | Thickness (μm) | Density (g/cm³) | Moisture Permeability*[1] (g/m² · 24 hrs) | Air Permeability*[2] (sec/100 cc) | Tear Strength*[3] (g/g) | Stretching State Along Mandrel |
|---|---|---|---|---|---|---|
| 1 | 68 | 0.62 | 1800 | 750 | 10/12 | Continuous and |

TABLE 1-continued

| Example No. | Thickness (μm) | Density (g/cm³) | Moisture Permeability*¹ (g/m² · 24 hrs) | Air Permeability*² (sec/100 cc) | Tear Strength*³ (g/g) | Stretching State Along Mandrel |
|---|---|---|---|---|---|---|
| 2 | 75 | 0.55 | 3500 | 200 | 9/12 | uniform stretching in a stable manner |
| 3 | 90 | 0.47 | 7200 | 60 | 11/12 | Continuous and uniform stretching in a stable manner |
| 4 | 55 | 0.80 | 200 | 30000 or more | 9/10 | Continuous and uniform stretching in a stable manner |
| 5 | 100 | 0.50 | 3900 | 100 | 20/22 | Continuous and uniform stretching in a stable manner |

*¹Measured according to JIS Z 0208
*²Measured according to JIS P 8117
*³Measured according to JIS Z 1702, machine direction/transverse direction

EXAMPLE 6

A powder (65 vol %) of an ethylene/butene-1 copolymer (density: 0.923 g/cm³, MFR: 0.9 g/10 min, Q value: 11, m.p.: 121° C.), 35 vol % of ground calcium carbonate (average particle size: 1.2 μ, in irregular form other than plates and rods), 0.1 part by weight of a heat stabilizer (2,6-di-t-butyl-p-cresol) per 100 parts by weight of the ethylene/butene-1 copolymer and 1.0 part by weight of a dispersant (oleic acid) per 100 parts by weight of the ground calcium carbonate were charged into a super mixer and were blended for 5 minutes. The blend was fed into a twin-screw extruder, from which a strand was extruded at 200° C. and cut into pellets.

The pellets were extruded at 210° C. from a 4-thread spiral annular die (lip diameter: 75 mm, lip gap: 1 mm) on an extruder (screw diameter: 50 mm, L/D ratio: 25) and the extrudate was brought into contact with a chilling mandrel (100 mm diameter) constructed internally to circulate water (5° C.) so as to solidify the melt at a blowup ratio of 1.33, followed by pulling a tubular form of unstretched film having a thickness of 130 μm at a rate of 4 m/min.

The film was heated to 110° C. on a preheating mandrel (98 mm diameter) connected below the chilling mandrel. Thereafter, the film was biaxially stretched along a truncated-conical mandrel (110° C. having a sand-blasted surface (asperities: 0.5 μm) which was directly connected at one end (98 mm diameter) to the preheating mandrel and terminated at the other end at a diameter of 250 mm. The cone angle of the mandrel was 90°. The stretching ratios were 2.5 and 3.0 in transverse and machine directions, respectively. Over the entire outside surface of the biaxially stretched tubular film off the frustoconical mandrel, chilling air (15° C.) was blown at 10 m/sec from an air ring (diameter: 350 mm, lip gap: 3 mm) positioned 50 mm below the bottom of the mandrel. At the same time, air (20° C.) was continuously blown into the tube of the film at 40 Nl/m².min from a conduit also positioned beneath the mandrel. As the air was forced to escape through the film, the tubular film was continuously pulled by nip rolls.

The appearance and physical properties of the resulting air-permeable film are shown in Table 2.

EXAMPLE 7

An air-permeable film was produced in the same procedure as in Example 6 except that the powder of ethylene/butene-1 copolymer was replaced by a powder of ethylene/propylene/butene-1 copolymer (density: 0.918 g/cm³, MFR: 0.70 g/10 min, Q value: 6, m.p.: 123° C.), and that chilling air was blown over the outside of the biaxially stretched tubular film at 5 m/sec while air was blown into the tube of the film at 20 Nl/m².min. The data for the film obtained is shown in Table 2.

EXAMPLE 8

An air-permeable film was produced in the same procedure as in Example 6 except that an ethylene/butene-1 copolymer having a density of 0.920 g/cm³, MFR of 1.0 g/10 min, Q value of 3.4 and m.p. of 124° C. was used, and that the unstretched tubular film was preheated and biaxially stretched at 113° C. The data for the product film is shown in Table 2.

EXAMPLE 9

An air-permeable film was produced in the same procedure as in Example 6 except for the following points: the powder of ethylene/butene-1 copolymer was replaced by a high-density polyethylene (density: 0.950 g/cm³, MFR: 0.05 g/10 min, m.p.: 132° C.); the feed was pelletized at 290° C. and extruded at 260° C. to form a tubular unstretched film; the film was preheated and biaxially stretched at 118° C. The data for the product film is shown in Table 2.

TABLE 2

| Example No. | Thickness (μm) | Density (g/cm³) | Moisture Permeability*¹ (g/m² · 24 hrs) | Air Permeability*² (sec/100 cc) | Tear Strength*³ (g/g) | Uniform Thickness in Transverse Direction | Softness |
|---|---|---|---|---|---|---|---|
| 6 | 50 | 0.55 | 5500 | 180 | 7/8 | Good | Soft |
| 7 | 45 | 0.60 | 3500 | 650 | 10/11 | Good | Soft |
| 8 | 52 | 0.55 | 5700 | 150 | 4.5/8 | Poor | Soft |
| 9 | 55 | 0.50 | 7000 | 55 | 4/4.5 | Slightly | Not soft |

TABLE 2-continued

| Example No. | Thickness (μm) | Density (g/cm$^3$) | Moisture Permeability*1 (g/m$^2$ · 24 hrs) | Air Permeability*2 (sec/100 cc) | Tear Strength*3 (g/g) | Uniform Thickness in Transverse Direction | Softness |
|---|---|---|---|---|---|---|---|
| | | | | | | poor | |

*1, *2 & *3 Same as defined in Table 1

EXAMPLE 10

A powder mixture (65 vol %) of equal weights of ethylene/butene-1 copolymer (density: 0.920 g/cm$^3$, MFR: 1.0 g/10 min, Q value: 3.4, m.p.: 124° C.) and high-density polyethylene (density: 0.949 g/cm$^3$, MFR: 0.07 g/10 min, Q value: 16, m.p.: 132° C.), 35 vol % of ground calcium carbonate (average particle size: 1.2 μm, in irregular form other than plates and rods), 0.1 part by weight of a heat stabilizer (2,6-di-t-butyl-p-cresol) per 100 parts by weight of the resin mixture, and 1.0 part by weight of a dispersant (oleic acid) per 100 parts by weight of the ground calcium carbonate were charged into a super mixer and were blended for 5 minutes. The blend was fed into a twin-screw extruder, from which a strand was extruded at 230° C. and cut into pellets.

The pellets were extruded at 230° C. from a 4-thread spiral annular die (lip diameter: 75 mm, lip gap: 1 mm) on an extruder (screw diameter: 50 mm, L/D ratio: 25) and the extrudate was brought into contact with a chilling mandrel (100 mm diameter) constructed internally to circulate water (5° C.) so as to solidify the melt at a blowup ratio of 1.33, followed by pulling the tubular form of unstretched film having a thickness of 120 μm at a rate of 5 m/min.

The film was heated to 118° C. on a preheating mandrel 98 mm diameter) connected below the chilling mandrel. Thereafter, the film was biaxially stretched along a truncated-conical mandrel (118° C.) having a sand-blasted surface (asperities: 0.5 μm) which was directly connected at one end (98 mm diameter) to the preheating mandrel and terminated at the other end at a diameter of 250 mm. The cone angle of the mandrel was 90°. The stretching ratio was 2.5 in each of the machine and transverse directions. Over the entire outside surface of the biaxially stretched tubular film off the frusto-conical mandrel, chilling air (15° C.) was blown at 15 m/sec from an air ring (diameter: 350 mm, lip gap: 3 mm) positioned 50 mm below the bottom of the mandrel. At the same time, air (20° C.) was continuously blow into the tube of the film at 50 Nl/m$^2$.min from a conduit also positioned beneath the mandrel. As air was forced to escape through the film, the tubular film was continuously pulled by nip rolls.

The appearance and physical properties of the resulting air-permeable film are shown in Table 3.

EXAMPLE 11

An air-permeable film was produced in the same procedure as in Example 10 except for the following points: a high-density polyethylene having a density of 0.952 g/cm$^3$, MFR of 0.06 g/10 min, Q value of 11 and m.p. of 133° C. was used; the tubular film was stretched to 2.3 times its length in machine direction; chilling air was blown over the outside surface of the biaxially stretched tubular film at 10 m/sec while air was blown into the tube of the film at 30 Nl/m$^2$.min. The data for the resulting film is shown in Table 3.

EXAMPLE 12

An air-permeable film was produced in the same procedure as in Experiment 10 except for the following points: the ethylene/butene-1 copolymer and the high-density polyethylene were used in amounts of 70 wt % and 30 wt %, respectively; the ground calcium carbonate had an average particle size of 1.08 μm; chilling air was blown over the outside of the biaxially stretched tubular film at 8 m/sec while air was blown into the tube of the film at 20 Nl/m$^2$.min. The data for the film obtained is shown in Table 3.

EXAMPLE 13

An air-permeable film was produced in the same procedure as in Example 10 except for the following points: the ethylene/butene-1 copolymer and high-density polyethylene were used in respective amounts of 5 wt % and 95 wt %; the ground calcium carbonate had an average particle size of 1.08 μm; air was blown into the tube of the biaxially stretched tubular film at 60 Nl/m$^2$.min. The data for the product film is shown in Table 3.

EXAMPLE 14

An air-permeable film was produced in the same procedure as in Example 10 except for the following points: a high-density polyethylene having a density of 0.951 g/cm$^3$, MFR of 0.8 g/10 min, Q value of 5.3 and m.p. of 133° C. and ground calcium carbonate having an average particle size of 1.08 μm were used; chilling air was blown over the outside of the biaxially stretched tubular film at 5 m/sec while air was blown into the tube of the film at 20 Nl/m$^2$.min. The data for the product film is shown in Table 3.

TABLE 3

| Example No. | Thickness (μm) | Density (g/cm$^3$) | Moisture Permeability*1 (g/m$^2$ · 24 hrs) | Air Permeability*2 (sec/100 cc) | Tear Strength*3 (g/g) | Uniform Thickness in Transverse Direction | Softness |
|---|---|---|---|---|---|---|---|
| 10 | 56 | 0.52 | 6000 | 100 | 7/7 | Good | Soft |
| 11 | 60 | 0.54 | 4000 | 220 | 9/7 | Good | Soft |
| 12 | 50 | 0.62 | 3700 | 500 | 8/8 | Good | Soft |
| 13 | 60 | 0.49 | 8500 | 50 | 4.5/4.5 | Good | Not soft |

TABLE 3-continued

| Example No. | Thickness (μm) | Density (g/cm$^3$) | Moisture Permeability*1 (g/m$^2$ · 24 hrs) | Air Permeability*2 (sec/100 cc) | Tear Strength*3 (g/g) | Uniform Thickness in Transverse Direction | Softness |
| --- | --- | --- | --- | --- | --- | --- | --- |
| 14 | 46 | 0.65 | 3000 | 1350 | 5/4.5 | Poor | Soft |

*1, *2 & *3 Same as defined in Table 1.

EXAMPLE 15

A powder (65 vol %) of an ethylene/butene-1 copolymer (density: 0.920 g/cm$^3$, MFR: 1.0 g/10 min, Q value: 3.4, m.p.: 124° C.), 53 vol % of an inorganic filler mixture consisting of 80 vol % of ground calcium carbonate (average particle size: 1.2 μ, in irregular form other than plates and rods) and 20 vol % of precipitated calcium carbonate (average particle size: 0.3 μ, cubic), 0.1 part by weight of a heat stabilizer (2,6-di-t-butyl-p-cresol) per 100 parts by weight of the ethylene/butene-1 copolymer and 1.0 part by weight of a dispersant (oleic acid) per 100 parts by weight of the inorganic filler mixture were charged into a super mixer and were blended for 5 minutes. The blend was fed into a twin-screw extruder, from which a strand was extruded at 200° C. and cut into pellets.

The pellets were extruded at 210° C. from a 4-thread spiral annular die (lip diameter: 75 mm, lip gap: 1 mm) on an extruder (screw diameter 50 mm, L/D ratio: 25) and the extrudate was brought into contact with a chilling mandrel (100 mm diameter) constructed internally to circulate water (5° C.) so as to solidify the melt at a blow up ratio of 1.33, followed by pulling a tubular form of unstretched film having a thickness of 110 μm at a rate of 5 m/min.

The film was heated to 110° C. on a preheating mandrel (98 mm diameter) connected below the chilling mandrel. Thereafter, the film was biaxially stretched along a truncated-conical mandrel (110° C.) having a sand-blasted surface (asperities: 0.5 μm) which was directly connected at one end (98 mm diameter) to the preheating mandrel and terminated at the other end at a diameter of 250 mm. The cone angle of the mandrel was 90°. The stretching ratios were 2.5 and 3.0 in transverse and machine directions, respectively. Over the entire outside surface of the biaxially stretched tubular film off the frustoconical mandrel, chilling air (15° C.) was blown at 5 m/sec from an air ring (diameter: 350 mm, lip gap: 3 mm) positioned 50 mm below the bottom of the mandrel. At the same time, air (20° C.) was continuously blown into the tube of the film at 5 Nl/m$^2$.min from a conduit also positioned beneath the mandrel. As the air was forced to escape through the film, the tubular film was continuously pulled by nip rolls.

The appearance and physical properties of the resulting air-permeable film are shown in Table 4.

EXAMPLE 16

An air-permeable film was produced in the same procedure as in Example 15 except that the inorganic filler mixture was composed of 90 vol % of ground calcium carbonate (average particle size: 1.8 μm, in irregular form other than plates and rods) and 10 vol % of precipitated calcium carbonate (average particle size: 0.3 μm, cubic). The data for the product film is shown in Table 4.

EXAMPLE 17

An air-permeable film was produced in the same procedure as in Example 15 except for the following points: the ethylene/butene-1 was replaced by a high-density polyethylene (density: 0.956 g/cm$^3$, MFR: 0.05 g/10 min, Q value: 7, m.p.: 135° C.); the feed was pelletized at 290° C. and extruded at 260° C. to provide a tubular unstretched film having a thickness of 90 μm; the film was preheated and biaxially stretched at 120° C. The data for the air-permeable film obtained is shown in Table 4.

EXAMPLE 18

An air-permeable film was produced in the same procedure as in Example 15 except that the inorganic filler was composed of 30 vol % ground calcium carbonate and 70 vol % precipitated calcium carbonate. The data for the air-permeable film obtained is shown in Table 4.

EXAMPLE 19

An air-permeable film was produced in the same procedure as in Example 15 except that the inorganic filler mixture was composed of 60 vol % ground calcium carbonate and 40 vol % precipitated calcium carbonate having an average particle size of 0.03 μm. The data for the air-permeable film obtained is shown in Table 4.

EXAMPLE 20

An air-permeable film was produced in the same procedure as in Example 15 except for the following points: a tubular form of unstretched film having a thickness of 130 μm was extruded from a feed using only ground calcium carbonate as the inorganic filler; the film was preheated and biaxially stretched at 113° C.; chilling air was blown over the outside of the stretched tubular film at 10 m/sec while air was blown into the tube of the film at 40 Nl/m$^2$. min. The data for the resulting air-permeable film is shown in Table 4.

EXAMPLE 21

An air-permeable film was produced in the same procedure as in Example 15 except that the inorganic filler mixture was composed of 80 vol % of ground calcium carbonate (average size: 0.9 μm, in irregular form other than plates and rods) and 20 vol % of ground calcium carbonate (average size: 0.6 μm, in irregular form other than plates and rods). The data for the product film is shown in Table 4.

TABLE 4

| Example No. | Thickness (μm) | Density (g/cm³) | Moisture Permeability*1 (g/m²·24 hrs) | Air Permeability*2 (sec/100 cc) | Tear Strength*3 (g/g) | Uniform Thickness in Transverse Direction | Softness |
| --- | --- | --- | --- | --- | --- | --- | --- |
| 15 | 38 | 0.61 | 3700 | 300 | 4/5 | Good | Very soft |
| 16 | 41 | 0.56 | 3900 | 170 | 4.5/4.5 | Good | Very soft |
| 17 | 35 | 0.55 | 6400 | 70 | 3/3.5 | Good | Soft |
| 18 | The tubular unstretched film did not stretch and had broken on the mandrel. | | | | | | |
| 19 | " | | | | | | |
| 20 | 42 | 0.56 | 4300 | 150 | 5/6 | Poor | Soft |
| 21 | —*4 | —*4 | —*4 | —*4 | —*4 | Poor | —*4 |

*1, *2 & *3 Same as defined in Table 1.
*4 Many extreme local neckings occurred and the thickness was not uniform. Therefore, evaluation was not made.

While the invention has been described in detail and with reference to specific embodiment thereof, it will be apparent to one skilled in the art that various changes and modifications can be made therein without departing from the spirit and scope thereof.

What is claimed is:

1. A process for producing an air-permeable film, which comprises:
   (a) biaxially stretching a tubular unstretched film of a composition comprising 42 to 87 vol % of a thermoplastic resin and 58 to 13 vol % of an inorganic filler along a truncated-conical mandrel;
   (b) blowing a gas over the outside of the biaxially stretched tubular film to cool said film; and
   (c) simultaneously and, continuously blowing a gas under controlled pressure into the tube of the film such that the gas penetrates through the film around its entire circumference to the exterior of the film.

2. The process according to claim 1, wherein said thermoplastic resin is an ethylene/α-olefin copolymer having a density of 0.910 to 0.940 g/cm³ and a melt flow rate of 0.1 to 5 g/10 min.

3. The process according to claim 1, wherein said thermoplastic resin is a high-density polyethylene having a density of 0.941 g/cm³ or more and a melt flow rate of 1.0 g/10 min or less.

4. The process according to claim 1, wherein said thermoplastic resin is an ethylene/α-olefin copolymer having a density of 0.910 to 0.940 g/cm³, a melt flow rate of 0.1 to 5 g/10 min and a Q value of 4 or more, said Q value being defined as the ratio of the weight average molecular weight to the number average molecular weight.

5. The process according to claim 1, wherein said thermoplastic resin is a mixture of 10 to 90 wt % of an ethylene/α-olefin copolymer having a density of 0.910 to 0.940 g/cm³ and a melt flow rate of 0.1 to 5 g/10 min and 90 to 10 wt % of a high-density polyethylene having a density of at least 0.941 g/cm³, a melt flow rate of no more than 1.0 g/10 min and a Q value of at least 8, said Q value being defined as the ratio of the weight average molecular weight to the number average molecular weight.

6. The process according to claim 1, wherein said inorganic filler has an average particle size of 0.05 to 4 μm.

7. The process according to claim 1, wherein said inorganic filler is a mixture of 50 to 97 vol % of a first inorganic filler having an average particle size of 0.7 to 4 μm and 50 to 3 vol % of a second inorganic filler having an average particle size of 0.05 to 0.7 μm, the two fillers being mixed in such proportions that the ratio of the average particle size of the first filler to that of the second filler is 2 to 20.

8. The process according to claim 1, wherein the biaxial stretching ratio is in the range of 1.5 to 4 in both the machine and transverse directions.

9. The process according to claim 1, wherein said inorganic filler is calcium carbonate, calcium oxide, talc, clay, silica, titanium oxide, alumina, aluminum sulfate, or mixtures thereof.

10. The process according to claim 7, wherein said first inorganic filler has an average particle size of 0.8 to 2 μm, and said second inorganic filler has an average particle size in the range of 0.1 to 0.6 μm.

11. The process according to claim 7, wherein the ratio of the average particle size of said first filler to said second filler ranges from 2.5 to 15.

12. The process according to claim 7, wherein 60 to 95 vol % of said first inorganic filler is mixed with 40 to 5 vol % of said second filler.

13. The process according to claim 1, wherein the composition of step (a) comprises 55 to 80 vol % of said thermoplastic resin and 45 to 20 vol % of said inorganic filler.

14. The process according to claim 1, wherein the stretching temperature (Ts) (°C.) and the melting point (Tm) (°C.) of the film being stretched have the relationship: $Tm - 50 \leq Ts \leq Tm - 5$ (°C.).

15. The process according to claim 1, wherein gas is blown into the tube of film in step (c) at a rate of from 0.1 to 150 Nl/m².min.

16. The process according to claim 15, wherein said gas flow rate ranges from 1 to 70 Nl/m².min.

17. The process according to claim 1, wherein said product air-permeable film, having a thickness ranging from 25 to 150 μm, has an air-permeability within the range of 25 to 30,000 seconds/100 cc and a moisture permeability within the range of 300 to 25,000 g/m² in 24 hours.

* * * * *